US010518473B2

(12) United States Patent
Huang et al.

(10) Patent No.: US 10,518,473 B2
(45) Date of Patent: Dec. 31, 2019

(54) PARTS ARRANGEMENT DETERMINATION FOR A 3D PRINTER BUILD ENVELOPE (71) Applicant: Hewlett-Packard Development Company, L.P., Houston, TX (US)

(72) Inventors: Wei Huang, Palo Alto, CA (US); Jun Zeng, Palo Alto, CA (US); Yan Zhao, Palo Alto, CA (US); Scott White, Sant Cugat del Valles (ES); Sebastia Cortes I Herms, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 44 days.

(21) Appl. No.: 15/564,393

(22) PCT Filed: Jul. 31, 2015

(86) PCT No.: PCT/US2015/043298
§ 371 (c)(1),
(2) Date: Oct. 4, 2017

(87) PCT Pub. No.: WO2017/023284
PCT Pub. Date: Feb. 9, 2017

(65) Prior Publication Data
US 2018/0133969 A1 May 17, 2018

(51) Int. Cl.
B29C 64/386 (2017.01)
B29C 64/171 (2017.01)
(Continued)

(52) U.S. Cl.
CPC .......... B29C 64/386 (2017.08); B29C 64/171 (2017.08); B33Y 10/00 (2014.12); B33Y 50/02 (2014.12); G05B 19/4099 (2013.01)

(58) Field of Classification Search
CPC ..... B29C 64/171; B29C 64/386; B33Y 10/00; B33Y 50/00; B33Y 50/02; G05B 19/4099
See application file for complete search history.

(56) References Cited

U.S. PATENT DOCUMENTS 6,101,290 A    8/2000  Easwar et al.
8,028,501 B2  10/2011  Buckley et al.
(Continued)

FOREIGN PATENT DOCUMENTS

GB      2493425 A    2/2013
JP   2012/096427 A   5/2012
(Continued)

OTHER PUBLICATIONS

Freens, Automating the Production Planning of a 3D Printing Factory, Mar. 2015, Eindhoven University of Technology, pp. 1-47.*

(Continued)

Primary Examiner — Kenneth M Lo
Assistant Examiner — Chad G Erdman
(74) Attorney, Agent, or Firm — HP Inc. Patent Department (57) ABSTRACT According to an example, an arrangement of parts to be printed in a build envelope of a three dimensional (3D) printer may be determined through identification of a plurality of parts to be printed and generation of a respective virtual bounding box for each of the plurality of parts. In one example, a determination may be made that a total volume occupied by the generated virtual bounding boxes falls below a predetermined threshold of the build envelope volume and an arrangement of the virtual bounding boxes inside the build envelope that results in a total height of the virtual bounding boxes being minimized may be determined, to enhance efficiency in printing of the plurality of parts by the 3D printer.

17 Claims, 7 Drawing Sheets (51) Int. Cl.
*B33Y 10/00* (2015.01)
*B33Y 50/02* (2015.01)
*G05B 19/4099* (2006.01)

(56) References Cited

U.S. PATENT DOCUMENTS

| | | |
|---|---|---|
| 8,868,230 B2 | 10/2014 | Tschanz et al. |
| 8,878,840 B2 | 11/2014 | Keough et al. |
| 2003/0028090 A1 | 2/2003 | Raghavan et al. |
| 2003/0053138 A1* | 3/2003 | Klein ................ H04N 1/3872 358/3.29 |
| 2006/0155418 A1 | 7/2006 | Bradbury et al. |
| 2011/0087350 A1 | 4/2011 | Fogel et al. |
| 2013/0016379 A1 | 1/2013 | Lou et al. |
| 2013/0041629 A1* | 2/2013 | Fisker ................ A61C 13/0004 703/1 |
| 2014/0188439 A1 | 7/2014 | Rorato |
| 2015/0005919 A1 | 1/2015 | McGatha et al. |
| 2016/0046074 A1* | 2/2016 | Jang ................ B33Y 50/02 700/119 |
| 2016/0085882 A1* | 3/2016 | Li ................ G06F 17/50 703/1 |
| 2016/0214325 A1* | 7/2016 | Tenma ................ G05B 19/4099 |

FOREIGN PATENT DOCUMENTS

| | | |
|---|---|---|
| JP | 2013159369 | 8/2013 |
| WO | WO-2013174671 | 11/2013 |

OTHER PUBLICATIONS

J.P.N. Freens, "Automating the Production Planning of a 3D Printing Factory", Eindhoven, 2015, pp. 71. http://static.tue.nl/uploads/media/2015_DC2015.019_JPN_Freens.pdf.

International Search Report and Written Opinion dated Jun. 3, 2016, PCT Patent Application No. PCT/US2015/043298, filed Jul. 31, 2015, Korean Intellectual Property Office.

E. Luttersa, et al., "3D Nesting of Complex Shapes", Procedia CIRP vol. 3, 45th CIRP Conference on Manufacturing Systems, Jan. 1, 2012, XP055516923, pp. 26-31.

* cited by examiner

PARTS ARRANGEMENT DETERMINATION FOR A 3D PRINTER BUILD ENVELOPE

CLAIM FOR PRIORITY

The present application is a national stage filing under 35 U.S.C. § 371 of PCT application number PCT/US2015/043298, having an international filing date of Jul. 31, 2015, the disclosure of which is hereby incorporated by reference in its entirety.

BACKGROUND 3D manufacturing systems typically employ additive manufacturing techniques to build or print parts within a 3D build envelope of the 3D manufacturing system. As individual parts typically do not require the entire 3D build envelope, 3D manufacturing systems are often operated to build multiple distinct parts within the build envelope concurrently during a common build operation.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are apparatuses and methods for determining an arrangement of parts to be printed in a build envelope of a three dimensional (3D) printer or other type of additive manufacturing device. In the methods, a plurality of parts/objects to be printed are identified and a respective virtual bounding box may be generated for each of the plurality of parts/objects. In one example, a determination may be made that a total volume occupied by the generated virtual bounding boxes falls below a predetermined threshold of the build envelope volume and an arrangement of the virtual bounding boxes inside the build envelope may be determined such that the arrangement results in a total height of the virtual bounding boxes being minimized. In another example, an arrangement of the virtual bounding boxes inside the build volume may be determined such that the arrangement results in a free space inside of the build volume having a least complex geometry. In both of the examples above, the arrangement of the virtual bounding boxes may be determined to enhance efficiency in printing of the plurality of parts/objects by the 3D printer.

In one regard, the use of the virtual bounding boxes instead of the parts themselves to determine the arrangement of the parts may simplify the arrangement determination because the virtual bounding boxes may have relatively simpler surfaces to compute and position as compared to the surfaces of the parts to be printed. In other words, it may be computationally simpler to arrange the virtual bounding boxes than to arrange the parts because the parts may have irregular shapes. The virtual bounding boxes disclosed herein may also be generated for parts having regular shapes, for instance, to provide for gaps to the formed between adjacent parts that are sufficient to prevent thermal coupling between the parts during printing.

The methods and apparatuses disclosed herein may therefore allow for a relatively quick determination to be made of the placement of the parts that substantially minimizes the time and material required to print the parts. Thus, the arrangement of parts determined through implementation of the methods and apparatuses disclosed herein may result in a near-optimal solution determined for instance almost in real time.

Figure 1:
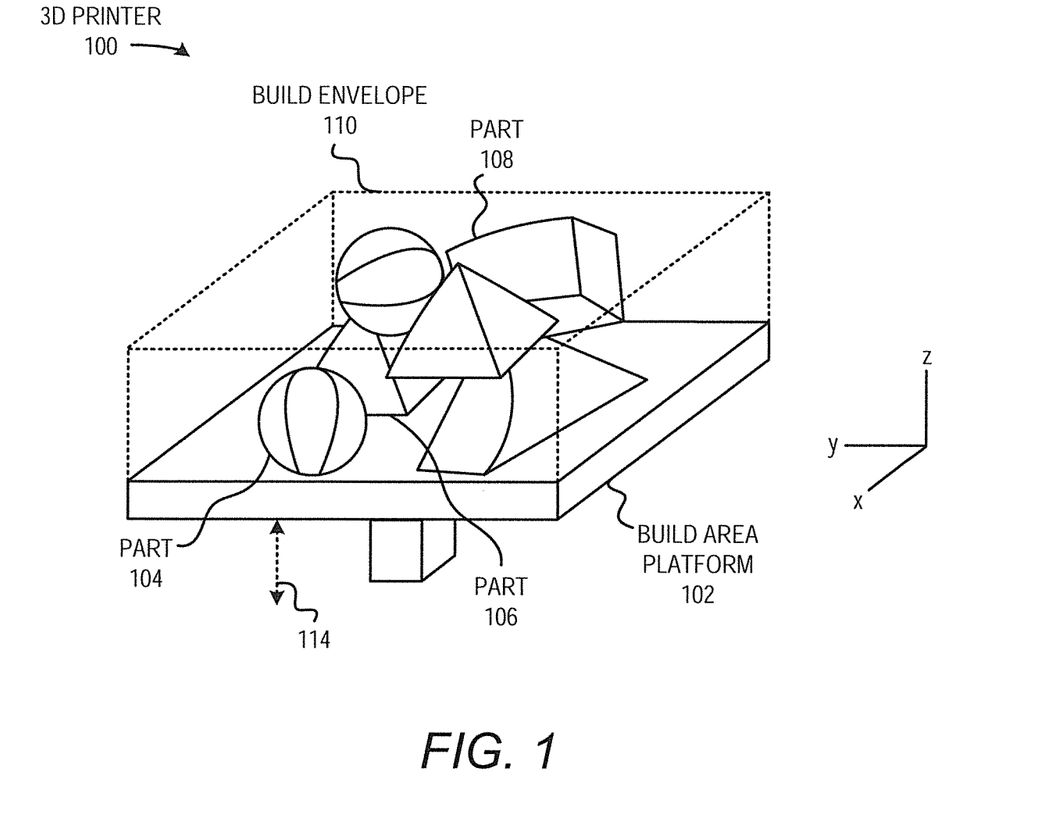
FIG. 1 shows a simplified isometric view of a three dimensional (3D) printer, according to an example of the present disclosure.

With reference first to FIG. 1, there is shown a simplified isometric view of a three dimensional (3D) printer 100 for generating, building, or printing three-dimensional parts on which features of the methods and apparatuses disclosed herein may be implemented, according to an example. It should be understood that the 3D printer 100 depicted in FIG. 1 may include additional components and that some of the components described herein may be removed and/or modified without departing from a scope of the 3D printer disclosed herein. It should also be understood that the 3D printer 100 depicted in FIG. 1 may not be drawn to scale and thus, the 3D printer 100 may have a different size and/or configuration other than as shown therein. For instance, the 3D printer 100 may include additional material ejecting devices, for instance, to generate three-dimensional objects with greater than two different types of materials.

As shown in FIG. 1, the 3D printer 100 may include a build area platform 102 that includes a build area surface on which three-dimensional (3D) objects or parts 104-108 are to be generated from a build material (not shown). Particularly, the 3D parts 104-108 (only three of the 3D parts are labeled with reference numerals for purposes of simplicity) are to be generated within a build envelope 110, which is equivalently referenced herein as a build volume. As shown in FIG. 1, the build envelope 110 may occupy a three-dimensional space on top of the build area surface of the build area platform 102. For instance, the build envelope 110 may be defined as the three-dimensional space in which the 3D printer 100 may print or otherwise generate the parts 104-108. The width and the length of the build envelope 110 may be limited by the width and the length of the build area platform 102 and the height of the build envelope 110 may be limited by the extent to which the build area platform 102 may be moved in the z direction, in which movement of the build area platform 102 is represented by the arrow 114. Although not shown, and actuator, such as a piston, may control the vertical position of the build area platform 102.

As shown in FIG. 1, the 3D printer 100 may print multiple parts during a common printing operation, i.e., a single building operation within the build envelope 110. According to an example, disclosed herein are methods and apparatuses for determining an arrangement of the parts to be printed in the build envelope 110 that results in the efficiency with which the parts are printed being enhanced or substantially optimized. The arrangement of the parts may include the placements of the parts in the x, y, and z directions as well as rotations of the parts, e.g., yaw, roll, and pitch, that result in the enhancement in efficiency. In one example, the efficiency may be considered to be enhanced or substantially optimized when the 3D printer 100 is able to print a maximum or near maximum number of parts during a single printing operation. In another example, the efficiency may be considered to be enhanced or substantially optimized when a plurality of parts are able to be printed in a minimized or near minimized amount of time during a single printing operation. In a further example, the efficiency may be considered to be enhanced or substantially optimized when the 3D printer 100 is able to print all of a plurality of parts in a single or in a minimized number of printing operations. Various manners in which the arrangement of the parts to be printed may be determined to enhance or substantially optimize efficiency in printing the parts are described in detail herein below.

It should be clearly understood that the 3D printer 100 depicted in FIG. 1 may have any of a plurality of different configurations and may use any of a number of different additive manufacturing techniques to build or print the parts 104-108. For instance, the 3D printer 100 may employ any of multijet fusion, selective laser sintering, selective laser melting, stereolithography, etc. Thus, for instance, various types of materials, e.g., power-based, liquid-based, etc., may be used in the 3D printer 100. In addition, the apparatuses disclosed herein to determine the arrangement of parts to be printed may be external to a 3D printer. For instance, the apparatuses disclosed herein may be computing devices that are to determine the arrangements of the parts to be printed and to communicate the determined arrangements to a 3D printer or additive manufacturing system.

It should be clearly understood that 3D printers having different configurations from the configuration depicted in FIG. 1 may implement the determined arrangements of the parts to be printed disclosed herein. For instance, any type of 3D printer or additive manufacturing system that is to print parts in a 3D build envelope or 3D build volume may implement the determined arrangement of parts to be printed as disclosed herein. Other types of additive manufacturing systems on which features of the methods and apparatuses disclosed herein may be employed include systems that employ selective laser sintering, selective laser melting, stereolithography, etc. As such, the depiction and the description of the 3D printer 100 are provided only as an example and those should not be construed as limiting the methods and apparatuses disclosed herein to the 3D printer 100. In addition, the apparatuses disclosed herein to determine the arrangement of parts to be printed may be external to a 3D printer. For instance, the apparatuses disclosed herein may be computing devices that are to determine the arrangements of the parts to be printed and to communicate the determined arrangements to a 3D printer or additive manufacturing system.

Figure 2:
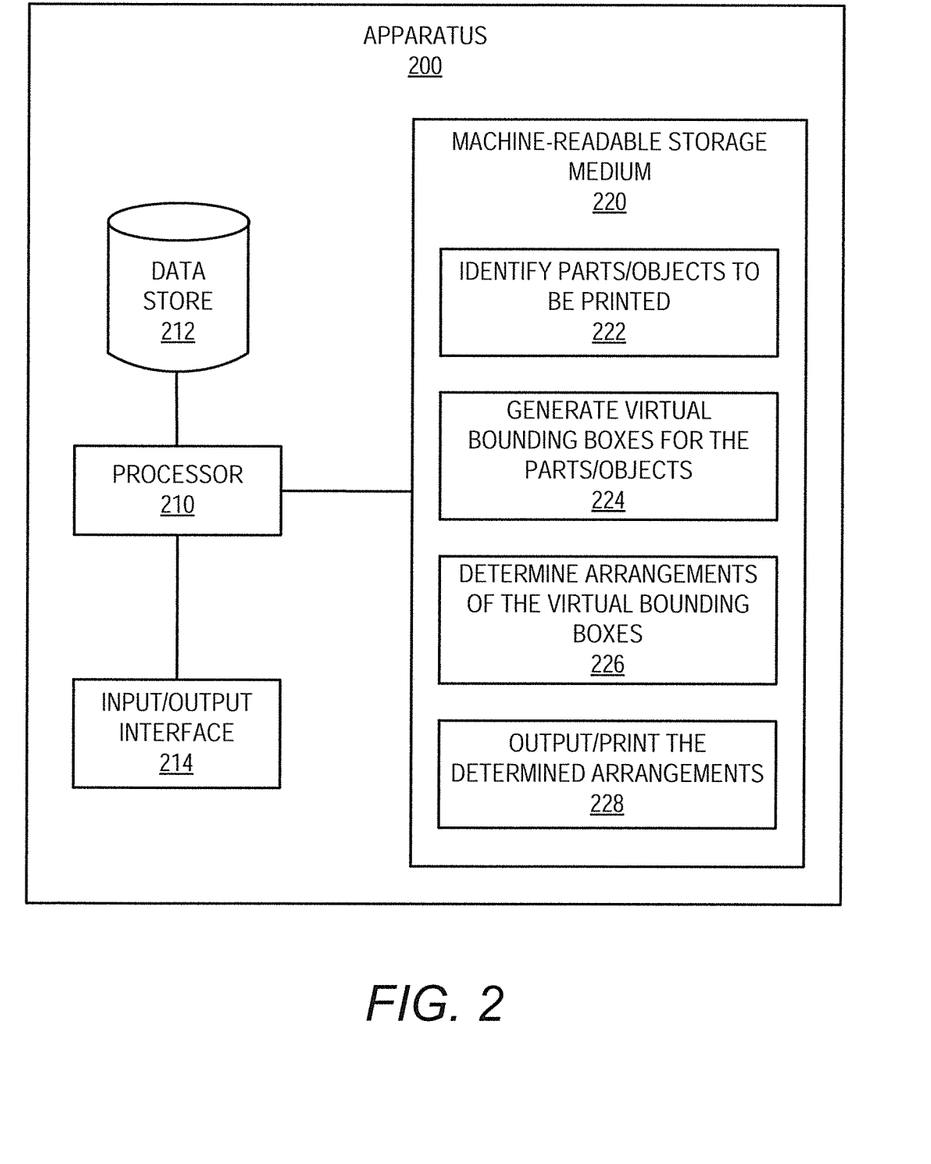
FIG. 2 shows a block diagram of an apparatus for determining an arrangement of parts to be printed in a build envelope of a 3D printer, according to an example of the present disclosure.

With reference now to FIG. 2, there is shown a block diagram of an apparatus 200 for determining an arrangement of parts to be printed in a build envelope of a 3D printer, according to an example. It should be understood that the apparatus 200 depicted in FIG. 2 may include additional components and that some of the components described herein may be removed and/or modified without departing from a scope of the apparatus 200.

The apparatus 200 may be a computing device, such as a personal computer, a server computer, a printer, a 3D printer, a smartphone, a tablet computer, etc. In a particular example, the apparatus 220 may be equivalent to the controller 130 depicted in FIG. 1. The apparatus 200 is depicted as including a processor 210 and a machine-readable storage medium 220. The processor 210 may be any of a central processing unit (CPU), a semiconductor-based microprocessor, an application specific integrated circuit (ASIC), and/or other hardware device suitable for retrieval and execution of instructions stored in the machine-readable storage medium 220. The processor 210 may fetch, decode, and execute instructions, such as instructions 222-228 stored on the machine-readable storage medium 220, to control processes to identify parts/objects to be printed 222, generate virtual bounding boxes for the parts/objects to be printed 224, determine arrangement of the virtual bounding boxes 226, an output/print the determined arrangement 228. As an alternative or in addition to retrieving and executing instructions, the processor 210 may include one or more electronic circuits that include electronic components for performing the functionalities of the instructions 222-228. These processes are described in detail below with respect to FIGS. 3 and 4.

The machine-readable storage medium 220 may be any electronic, magnetic, optical, or other physical storage device that contains or stores executable instructions. Thus, the machine-readable storage medium 220 may be, for example, Random Access Memory (RAM), an Electrically Erasable Programmable Read-Only Memory (EEPROM), a storage device, an optical disc, and the like. In some implementations, the machine-readable storage medium 220 may be a non-transitory machine-readable storage medium, where the term "non-transitory" does not encompass transitory propagating signals. As described in detail below, machine-readable storage medium 220 may be encoded with a series of executable instructions 222-228 to generate and output/print arrangements of parts to be printed by a 3D printer that results in an enhanced the efficiency in the printing of the parts.

As also shown in FIG. 2, the apparatus 200 may also include a data store 212 on which the processor 210 may store information, such as information pertaining to the parts to be printed. The data store 212 may be volatile and/or non-volatile memory, such as DRAM, EEPROM, MRAM, phase change RAM (PCRAM), memristor, flash memory, and the like. The apparatus 200 may further include an input/output interface 214 through which the processor 210 may communicate with an external device(s) (not shown), for instance, to receive and store the information pertaining to the parts to be printed. The input/output interface 214 may include hardware and/or software to enable the processor 210 to communicate with the external device(s). The input/output interface 214 may enable a wired or wireless connection to the output device(s). The input/output interface 214 may further include a network interface card and/or may also include hardware and/or software to enable the processor 210 to communicate with various input and/or output devices, such as a keyboard, a mouse, a display, another computing device, etc., through which a user may input instructions into the apparatus 200.

Figure 3:
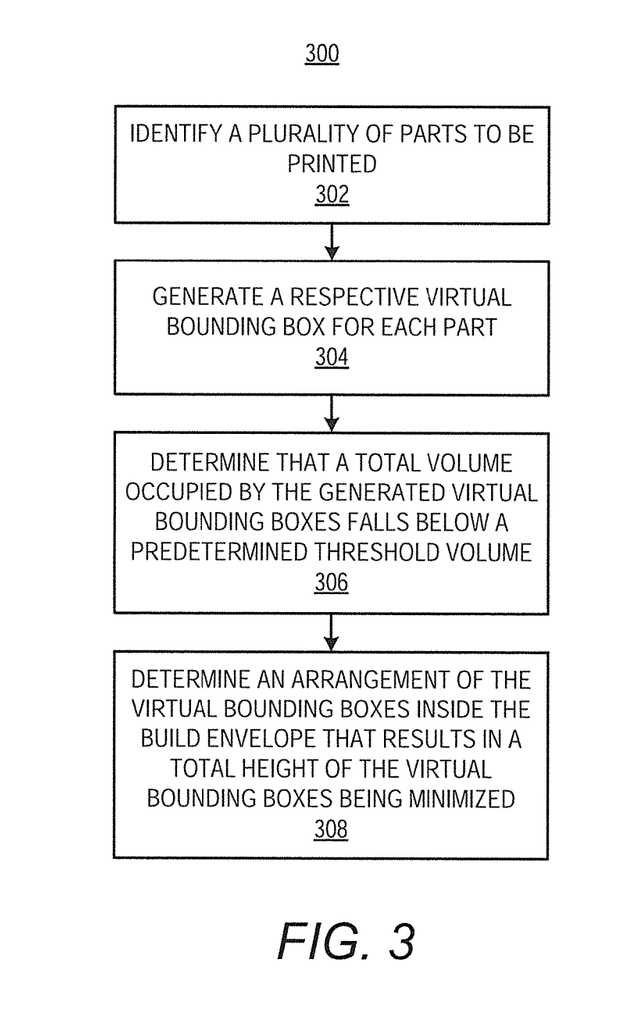
FIGS. 3 and 4, respectively, show flow diagrams of methods for determining arrangements of parts to be printed in a build envelope of a 3D printer, according to two examples of the present disclosure.
Figure 4:
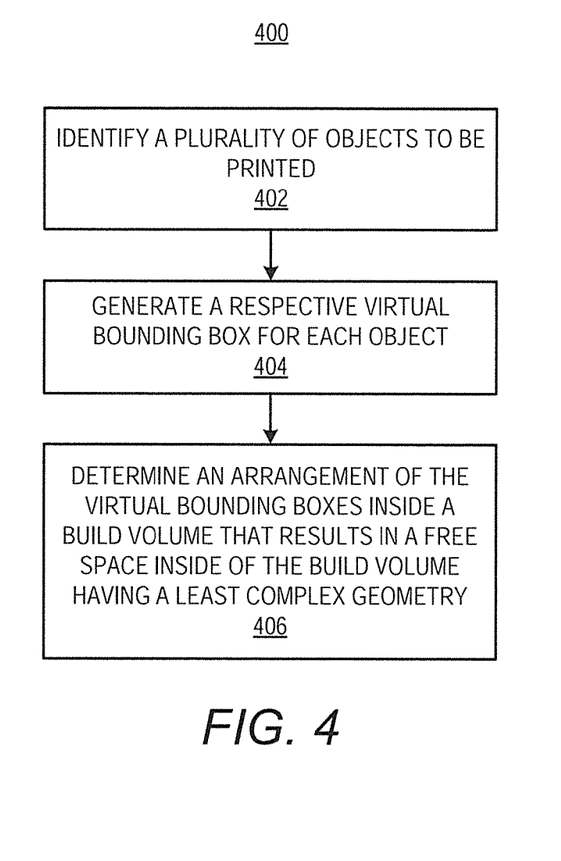

With reference now to FIGS. 3 and 4, there are respectively shown flow diagrams of methods 300 and 400 for determining arrangements of parts to be printed in a build envelope of a 3D printer, according to two examples. It should be understood that the methods 300 and 400 depicted in FIGS. 3 and 4 may include additional operations and that some of the operations described therein may be removed and/or modified without departing from the scopes of the methods 300 and 400. The descriptions of the methods 300 and 400 are made with reference to the features depicted in FIG. 2 for purposes of illustration and thus, it should be understood that the methods 300 and 400 may be implemented in apparatuses having architectures different from those shown in FIG. 2.

Generally speaking, the processor 210 of the apparatus 200 may implement or execute the instructions 222-228 stored on the machine-readable storage medium 220 to perform either of the methods 300 and 400.

With reference first to the method 300 in FIG. 3, at block 302, the processor 210 may identify a plurality of parts to be printed. The processor 210 may identify the plurality of parts to be printed in any suitable manner. For instance, the processor 210 may receive or otherwise access a file containing information pertaining to the plurality of parts to be printed from an external device or from the data store 212. In any regard, the information pertaining to the plurality of parts may include an identification of each of the parts such as a part number, part name, or other identifier. The information pertaining to the plurality of parts may also include data identifying the physical characteristics of the parts, for instance, the dimensions of the parts. The information may further include data identifying whether the parts are to have predefined properties, for instance, that the parts are to be stronger along one axis as compared to another axis, which may affect the orientation in which the parts are printed.

According to an example, in instances in which there are more parts to be printed than there is room in the build envelope 110, the processor 210 may sort the parts according their respective due dates. In addition, the processor 210 may select the parts having the closest due dates to be printed prior to the parts having the later due dates.

Figure 5:
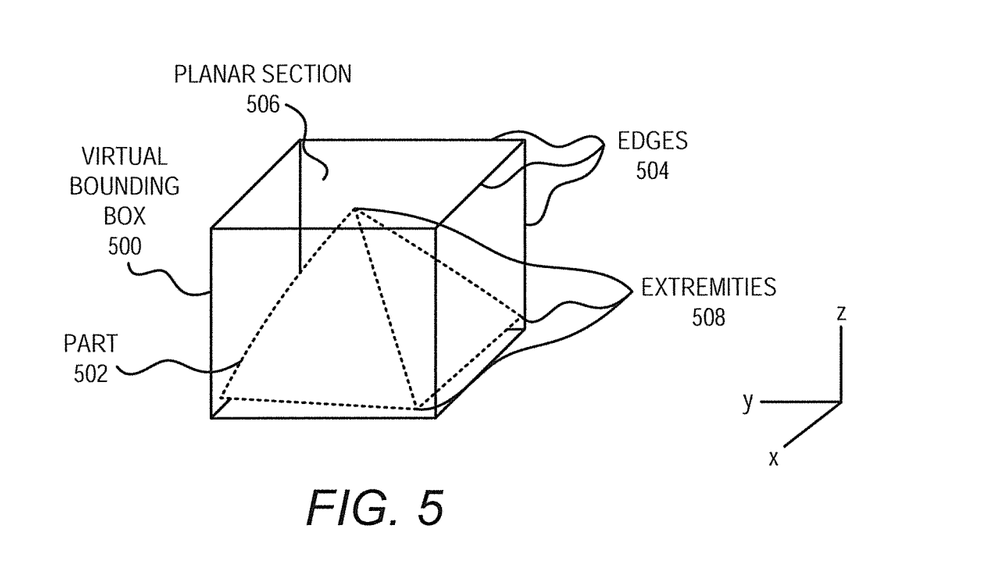
FIG. 5 shows a diagram of a virtual bounding box and a part, according to an example of the present disclosure.

At block 304, the processor 210 may generate a respective virtual bounding box for each of the plurality of parts to be printed identified at block 302. An example of a virtual bounding box 500 for a part 502 to be printed is depicted in FIG. 5. The part 502 is depicted with dashed lines to better distinguish the part 502 from the virtual bounding box 500. The virtual bounding box 500 for a part 502 to be printed may be defined as a virtual rectangular (or square) box having edges 504 and planar sections 506 that are parallel with the x, y, and z axes and completely encompass the part 502 to be printed. As shown in FIG. 5, the planar sections 506 are the sections between four respective edges and thus, the virtual bounding box 504 has twelve edges and six planar sections 506.

According to an example, the virtual bounding box 500 may be generated such that the edges 504 and/or the planar sections 506 contact or nearly contact the extremities 508, e.g., the outermost surfaces or points, of the part 502 to be printed. In another example, the virtual bounding box 500 may be generated such that a relatively small gap is maintained between the extremities 508 of the part 502 to be printed and the edges 504 and/or the planar sections 506 of the virtual bounding box 500. The gaps may be maintained, for instance, to thermally de-couple the part 502 from other parts during printing. In addition, the size of the gaps may be fixed or may vary depending upon the volume of neighboring parts to be printed. For instance, the gaps may be larger when there are a large number of neighboring parts to be printed as there may be a relatively larger amount of thermal coupling between the parts during printing.

According to an example, the part 502 may be virtually oriented (yaw, roll, pitch) into multiple positions and the processor 210 may compute a virtual bounding box corresponding to each of the multiple positions. The processor 210 may compute the volume for each of the computed virtual bounding boxes and may determine which orientation of the part 502 resulted in the smallest volume virtual bounding box. The processor 210 may generate the virtual bounding box 500 for the part 502 to be the virtual bounding box 500 having the smallest volume.

In many 3D printers, the properties of a printed part in the z direction are different from the properties of the printed part in the x or y directions. For instance, a printed part may have be relatively stronger along the x and y directions as compared with the z direction. As such, some parts may have a requirement that they be printed with a predetermined orientation in one of the x, y, or z directions. According to an example, the processor 210 may maintain the predetermined orientation of a part to be printed in generating the virtual bounding box 500. For instance, in rotating the part 502 into multiple positions, the processor 210 may limit the multiple positions to those that meet the predetermined orientation requirement. Additionally, the processor 210 may store the virtual bounding box 500 for the part such that the virtual bounding box 500 maintains the predetermined orientation requirement of the part. For instance, the processor 210 may store the virtual bounding box 500 with an indication that the virtual bounding box 500 may or may not be rotated along one or more of its axes.

Following block 304, therefore, a virtual bounding box 500 for each of the parts to be printed may be generated and stored, for instance, in the data store 212.

At block 306, the processor 210 may determine that a total volume occupied by the generated virtual bounding boxes falls below a predetermined threshold of the volume of the build envelope. The predetermined threshold may be defined as a predetermined percentage of the volume of the build envelope. By way of particular example in which the predetermined threshold is 70%, the processor 210 may determine that the total volume occupied by the generated virtual bounding boxes falls below the predetermined threshold of the volume of the build envelope when the total volume occupied by the generated virtual bounding boxes is smaller than the volume of the build envelope. In other examples, the predetermined threshold may be, for instance, anywhere between from around 60% to around 80%.

Alternatively, if the processor 210 determines that the total volume occupied by the generated virtual bounding boxes is equal to the volume of the build envelope or above any of the predetermined thresholds discussed above, the processor 210 may determine an arrangement of the virtual bounding boxes that results in the virtual bounding boxes fitting within the build envelope. The processor 210 may also output this determined arrangement to be implemented by a 3D printer in printing the parts. Additionally, if the processor 210 determines that the total volume occupied by the generated virtual bounding boxes exceeds the volume of the build envelope, the processor 210 may remove one or more of the parts from being printed with the remaining parts during a single printing operation and may attempt to determine another arrangement of the parts. The removed part(s) may remain in the parts pool to be printed during a next printing operation.

In any regard, following the determination at block 306, the processor 210 may determine an arrangement of the virtual bounding boxes inside the build envelope that results in a total height (z dimension) of the virtual bounding boxes being minimized as indicated at block 308. Minimization of the total height of the virtual bounding boxes may enhance efficiency in printing of the plurality of parts by the 3D printer because production cost, e.g., time, material, energy, etc., may scale with the number of layers and thus height. In other words, minimizing the z dimension of the parts to be printed may reduce or minimize production cost.

Figure 6:
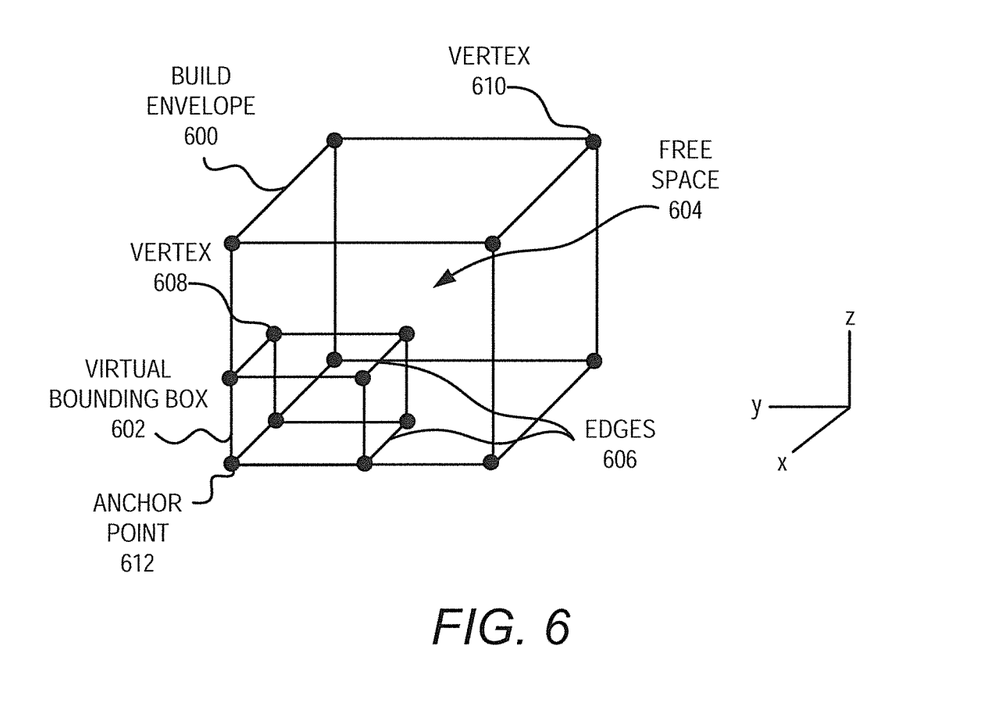
FIG. 6 shows a diagram of a build envelope and a virtual bounding box, according to an example of the present disclosure.

With reference to FIG. 6, there is shown an example of a build envelope 600 and a virtual bounding box 602 positioned within the build envelope 600. According to an example, the processor 210 may, in addition to minimizing the z dimension, determine an arrangement of the virtual bounding boxes 602 that results in a free space 604 inside of the build envelope 600 having a least complex geometry. The free space 604 inside of the build envelope 600 may be defined as the space inside of the build envelope 600 that is not occupied by a virtual bounding box 602. Additionally, a free space 604 may be considered to have a least complex geometry when the free space 604 has a least number of edges, in which the least complex geometry is a heuristic property of the free space 604. In FIG. 6, only two of the edges 606 are labeled for purposes of simplicity, but it should be understood that the lines between respective pairs of vertices 608 of the virtual bounding boxes 602 and the lines between respective pairs of vertices 610 of the build envelope 600 may also be considered to be edges 606.

The least complex geometry of the free space 604 may be considered as describing the "goodness" of the free space to accommodate a next virtual bounding box to be placed in the free space. In another example, the free space 604 may be considered to have a least complex geometry when the dimensional ratios within the free space 604 are close to one, which may make it easier to find a suitable position in the free space 604 for a next virtual bounding box because the free space 604 may have more of a squared structure. According to an example, the machine-readable storage medium 220 depicted in FIG. 2 may also include machine learning instructions that may include multiple heuristics that define the "least complexity" or goodness, of a free space. The processor 210 may execute the machine learning instructions to, for example, score each heuristic rule, for instance, the least number of edge counts, based on the final packing quality (e.g., final packing density) associated with a particular profile of a pool of parts. The processor 210 may use this score to determine the best heuristic rule to use in determining the arrangement of virtual bounding boxes 602.

By way of example, an arrangement of virtual bounding boxes 602 may result in the free space 604 having a least complex geometry when a maximum number of the virtual bounding boxes 602 have common edges, such as by arranging the virtual bounding boxes 602 to be in contact with each other.

According to an example, the processor 210 may arrange the virtual bounding boxes 602 having the longest lengths inside the build envelope 600 prior to arranging the virtual bounding boxes 602 having shorter lengths. This may be done because smaller virtual bounding boxes may be simpler to fit into a remaining free space 604 as compared with larger virtual bounding boxes. In this example, the processor 210 may sort the virtual bounding boxes based upon a property of the respective virtual bounding boxes and may generate a sorted parts list corresponding to the sorted virtual bounding boxes to determine the sort order of the virtual bounding boxes. For instance, the processor 210 may sort the virtual bounding boxes in descending order starting with the virtual bounding box having the largest length and ending with the virtual bounding box having the shortest length. In addition, or alternatively, the processor 210 may sort the virtual bounding boxes in descending order starting the virtual bounding box corresponding to a part having the closest due date. In this example, the processor 210 may also sort the virtual bounding boxes such that the virtual bounding boxes corresponding to the parts that have similar due dates are arranged according to their lengths, e.g., the virtual bounding boxes having larger lengths are ranked higher than the virtual bounding boxes having shorter lengths.

The processor 210 may thus place the virtual bounding boxes 602 inside of the build envelope 600 in the order in which the parts to which the virtual bounding boxes 602 correspond are arranged in the sorted parts list. In addition, the processor 210 may determine the locations inside of the free space 604 at which the virtual bounding boxes 602 are placed as locations at which the virtual bounding boxes 602 do not overlap each other and result in the free space 604 having the least complex geometry. Thus, by way of example, the processor 210 may place a virtual bounding box 602 having the largest length at a location inside of the build envelope 600 that results in the free space 604 having the least number of edges 606. As shown in FIG. 6, this may include placing a first virtual bounding box 602 at a corner of the build envelope 600.

In determining the placements of the virtual bounding boxes 602 inside of the build envelope 600, the processor 210 may apply implicit surfaces to functionally represent the shapes of the virtual bounding boxes 602, which are rectangular cubes. The application of implicit surfaces to functionally represent the shapes of the virtual bounding boxes 602 may enable the processor 210 to compute the geometries of the virtual bounding boxes 602 in a relatively fast manner. In implicit representation, the intersection operation may be realized by a max operation, which may be represented in closed form by the R function or computed point-wisely. According to an example, a rectangular cube, e.g., the build envelope 600 and the virtual bounding box 602, may be functionally represented using the R function.

Figure 7A:
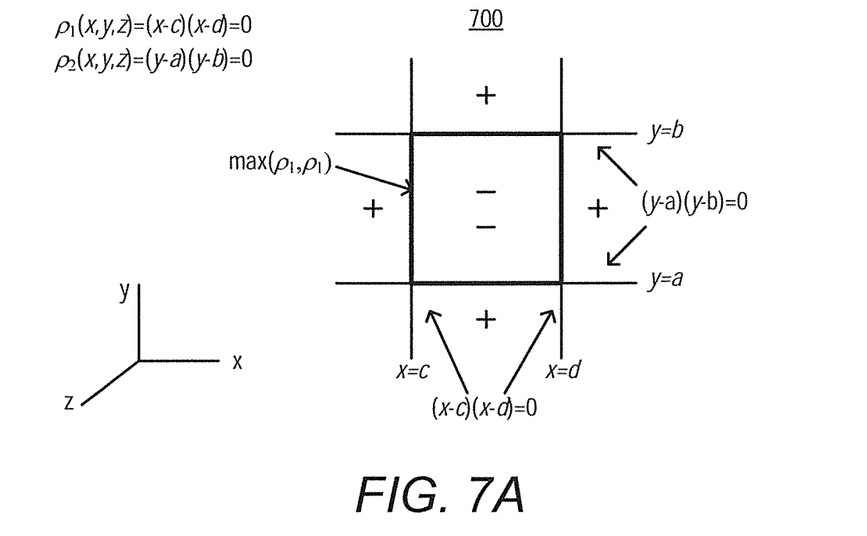
FIG. 7A depicts a diagram of a surface having a column along the z-axis with a rectangular cross-section from two sets of two parallel planes in the x- and y-axes, according to an example of the present disclosure.
Figure 7B:
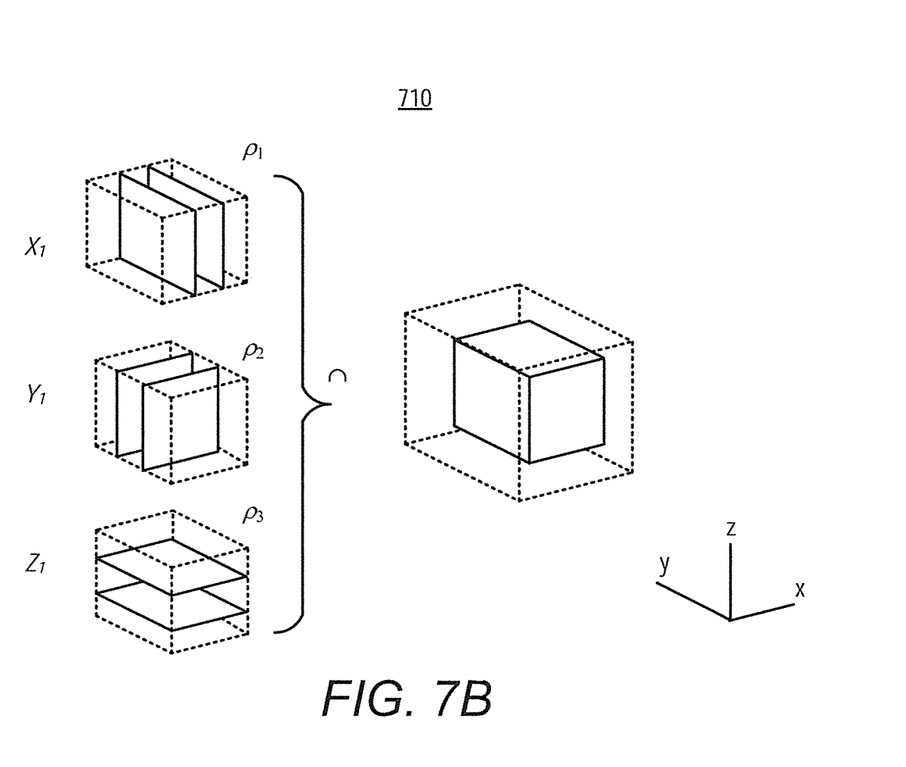
FIG. 7B depicts a diagram of a scheme for the construction of an implicit box geometry from three sets of two parallel planes perpendicular to the x-, y-, and z-axes, according to an example of the present disclosure.

An example of a manner in which the implicit surfaces of a rectangular cube may be computed is described with respect to FIGS. 7A and 7B. FIG. 7A depicts a diagram 700 of a surface having a column along the z-axis with a rectangular cross-section from two sets of two parallel planes in the x- and y-axes. FIG. 7B depicts a diagram 710 of a scheme for the construction of an implicit box geometry from three sets of two parallel planes perpendicular to the x-, y-, and z-axes. The implicit surface formed by $\rho_1$, $\rho_2$, and $\rho_3$ is the R function:

$$\rho_{cube} = \tfrac{1}{2}(\rho_{1\cap2}+\rho_3+\sqrt{\rho^2_{1\cap2}+\rho_3^2-2\rho_{1\cap2}\rho_3})=0. \qquad \text{Equation 1:}$$

The intersection of $\rho_1$, $\rho_2$, may be represented by the R function as:

$$\rho_{1\cap2} = \tfrac{1}{2}(\rho_1+\rho_2+\sqrt{\rho_1^2+\rho_2^2-2\rho_1\rho_2})=0. \qquad \text{Equation 2:}$$

The intersection of $\rho_{1\cap2}$ and $\rho_3$ may be represented by R function as:

$$\rho_c = \tfrac{1}{2}(\rho_{1\cap2}+\rho_3+\sqrt{\rho_{1\cap2}^2+\rho_3^2-2\rho_{1\cap2}\rho_3})=0. \qquad \text{Equation 3:}$$

$$\rho_1(x,y,z)=(x-c)(x-d)=0. \qquad \text{Equation 4:}$$

$$\rho_2(x,y,z)=(y-a)(y-b)=0. \qquad \text{Equation 5:}$$

$$\rho_3(x,y,z)=(z-e)(z-g)=0. \qquad \text{Equation 6:}$$

Additionally, the R function may be selected because it may efficiently and accurately compute the resulting implicit function.

The functional representation ($f$) of a rectangular cube, which may be the build envelope 600 or a virtual bounding box 602, may be determined using the following equations:

```
function f=makeCube(X,a,b,Y,c,d,Z,e,g)
    f1=plane(X,a,b);
    f2=plane(Y,c,d);
    f3=plane(Z,e,g);
    f12max=0.5*(f1+f2+√(f1²+f2²-2*f1*f2));
    f=0.5.*(f12max+f3+√(f12max²+f3²-2*f12max*f3));
end
    function f=plane(X,a,b)
    f=(X-a).*(X-b);
end.
```

Figure 8:
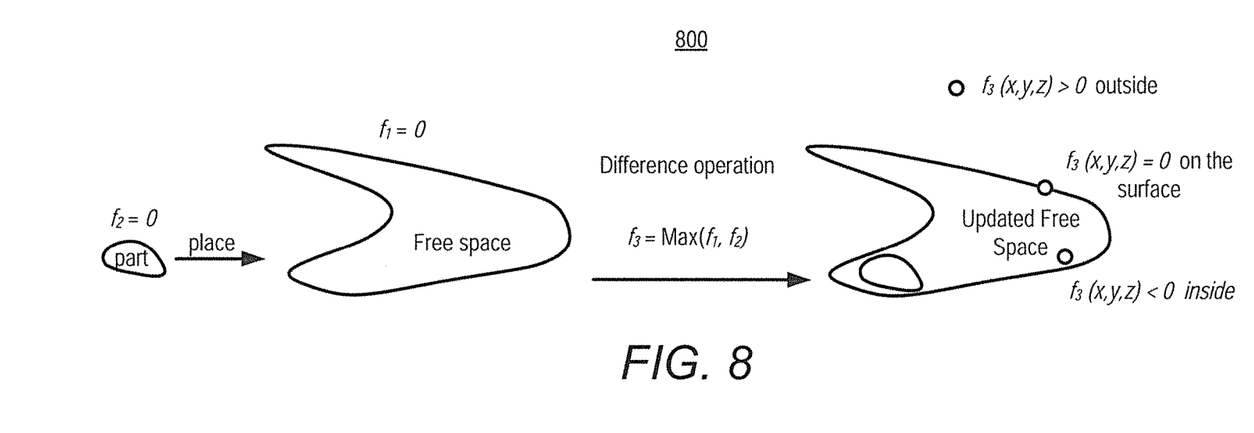
FIG. 8 depicts a diagram of a free space and a part, according to an example of the present disclosure.

Additionally, with reference to the diagram 800 depicted in FIG. 8, any given point (X,Y,Z) inside or outside of a free space at any given step in a packing operation of the virtual bounding boxes 602 inside of the build envelope 600 may be determined through the following process:

```
function f=makeFreeSpace(X,Y,Z,n,a,b,c,d,e,g)
    for i=1: n-1% number of bounding boxes already packed
        in the build volume
        if i==1% Build Volume
            f=makeCube(X,a[i],b[i],Y,c[i],d[i],Z,e[i],g[i]);
        else
            f1=makeCube(X,a[i+1],b[i+1],Y,c[i+1],d[i+1],Z,e
                [i+1],g[i+1]);% bounding box
            f=max(f,-f1); % difference.
```

With reference back to FIG. 6, the free space 604 in the build envelope 600 may thus be computed using the process described above. In the discussions above, all of the implicit surfaces are defined such that the points of the implicit surfaces that are inside the free space are negative and the points that are outside of the free space are positive. It should, however, be understood that these points may be defined in the opposite manner by placing a (−) in front of the functions noted above. That is, the points of the implicit surfaces that are inside of the free space may be positive and the points that are outside of free space may be negative. In this case, the "max" operation is a union operation, while the "min" operation is an intersection operation. Additionally, all of the other Boolean operations may be changed accordingly.

Figure 9:
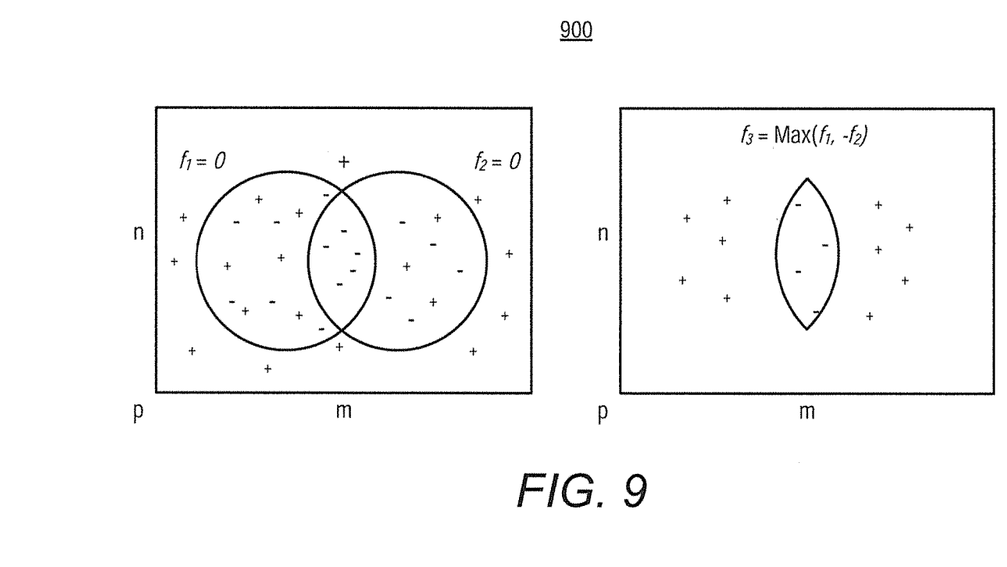
FIG. 9 depicts a diagram of Boolean operations of two shapes in three dimensions, according to an example of the present disclosure.

With reference to the diagram 900 in FIG. 9, Boolean operations of two shapes in three dimensions may functionally be computed using the following process:

```
for 0 < i < m
    for 0 < j < n
        for 0 < k < p
            if f₁(i, j, k) < f₂(i, j, k)
                f₃(i, j, k) = f₂(i, j, k)
            else
                f₃(i, j, k) = f₁(i, j, k)
            end
        end
    end
end.
```

Initially, the free space 604 of the build envelope 600 is defined as the entire volume of the build envelope 600. The functional representation of the free space 604 is given by Equations 1-6 described above and FIGS. 7A and 7B. A part, represented by its virtual bounding box 602, may also be represented functionally according to Equations 1-6 and FIGS. 7A and 7B. Placing this virtual bounding box 602 into the build envelope 600 results in a new, smaller free space 604, which is basically a difference (Boolean) operation of the build envelope 600 and the virtual bounding box 602. The resulting updated free space (f3) may now receive a new part (new virtual bounding box), which is the new f1 for next virtual bounding box.

Alternatively to the functional representation of a rectangular cube described above, the different operation between the build envelope 600 and the virtual bounding box 602 may be implemented functionally according to the Boolean operation described above with respect to FIG. 8. For instance, the 3D space (e.g., the build envelope 600) may be sampled using sample points. These sample points may be evenly distributed mesh points (m by n by p in all three dimensions) as shown in FIG. 9. For each shape, within the tolerance ε, if the sample point is outside the surface, the value is positive, if the sample point is inside the surface, the value is negative, and if the sample point is on the surface, the value is equal to zero. The Boolean operation is then translated into an algebraic computation of the shape value per sample point, and then the value is compared to determine which function this sample point should obtain (pseudo code described above with respect to FIG. 9). According to an example, the pseudo code described above with respect to the description of FIG. 9 is a fast computation that may be massively parallelized at the sample point level on a graphics processing unit (GPU).

In addition or alternatively to the implicit functional representation of shapes described above, the processor 210 may maintain a list of edges 606 that explicitly tracks the f1=0 surfaces that enclose the free space 604. As discussed above, a first virtual bounding box 602 may be placed such that a corner of the virtual bounding box 602 is placed at a corner of the free space 604 as shown in FIG. 6 such that an edge 606 of the virtual bounding box 602 aligns with (e.g., overlaps or partially overlaps) an edge 606 of the free space 604. This arrangement may result in the free space 604 having the least complex geometry, e.g., the least number of edges 606, with the virtual bounding box 602 placed in the free space 604. The edge list for a free space 604 initially includes the 8 edges of the build envelope 600. Each edge 606 is defined by two vertices 610 serving as respective anchor points.

As shown in FIG. 6, placement of the virtual bounding box 602 clips two edges that connect with an anchor point 612. This clipping procedure may be implemented by using the corresponding vertices 608 in the virtual bounding box 602 to replace this chosen anchor point 612 in the edge list. Additionally, the edge list may grow to include all of the additional edges 606 of the virtual bounding box 602 that are not connected to the anchor point 612. This procedure may be repeated for additional virtual bounding boxes placed into the free space 604.

Following placement of the virtual bounding boxes into the free space 604, each of the anchor points, e.g., vertexes 608, 610, to which the virtual bounding boxes have been connected may be identified in the edge list. For instance, those anchor points may be removed from the edge list. In addition, the anchor points of the newly placed virtual bounding boxes may be added to the edge list, such that the edge list may identify the anchor points that are available to receive a new virtual bounding box.

Figure 10A:
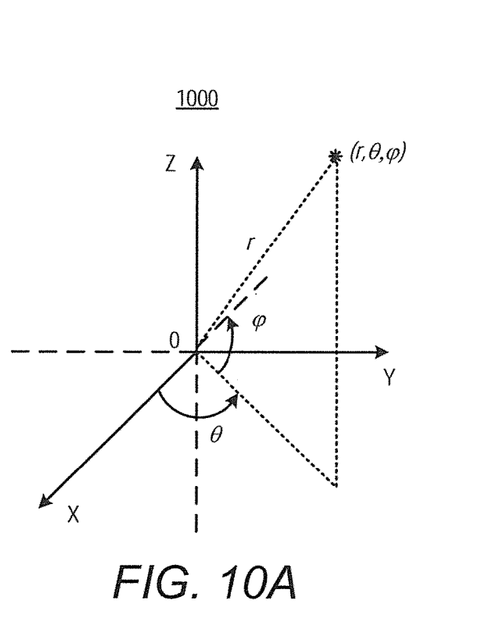
FIGS. 10A and 10B, respectively, show diagrams of a manner in which a solid angle of an anchor pint facing toward a free space may be computed, according to an example of the present disclosure.
Figure 10B:
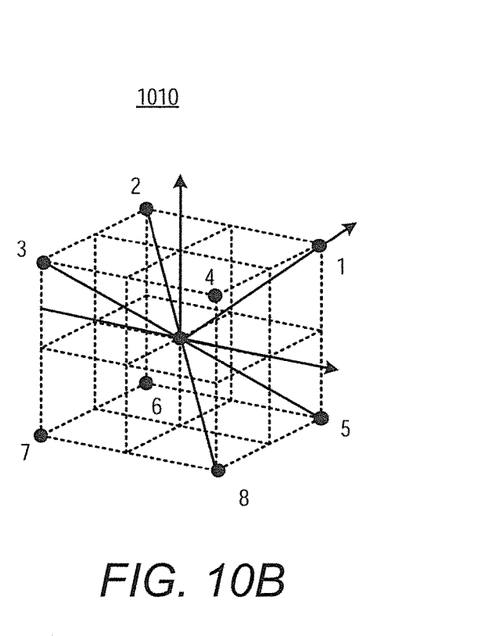

For a given anchor point, its solid angle facing toward the free space 604 defined by the f1=0 surface may be computed in a manner as shown in the diagrams 1000 and 1010 respectively depicted in FIGS. 10A and 10B. That is, in FIGS. 10A and 10B, r may be set as a very small distance and the n test points may be evenly distributed in the range of $\theta \in (0, 2\pi)$ and $\epsilon(0,\pi)$. For example, when n=8, i.e., the partition angle is spaced by $\pi/2$ increments, octant test points may be obtained. The anchor point having the smallest solid angle is likely to have the least flexibility in the associated free space 604 and thus is likely to be associated with the least valuable real estate. As such, the processor 210 may consume those anchor points early if possible so that more valuable real estate may be saved for future virtual bounding boxes. Based on this heuristic, all of the possible anchor points may be ranked based on their solid angles in descending order.

According to an example, the processor 210 may rank all of the possible anchor points based on their z-coordinates in ascending order. Then for all of the anchor points that have similar z-coordinates (e.g., the difference in z-coordinates is within a given tolerance), the processor 210 may sort the anchor points based on their solid angles in descending order. This ranking gives first priority to minimizing the total packing height and second priority to the least valuable real estate in the free space 604.

According to an example, the processor 210 may freely re-orient the virtual bounding boxes as they are placed into the free space 604, including in the z-direction. In addition, the edge-alignment constraint may force the angles at which the virtual bounding boxes are incremented to be $\pi/2$. By way of particular example, the processor 210 may orient a virtual bounding box in the following manner:

---

For each vertex of the virtual bounding box:
    Translate the virtual bounding box so that the vertex overlaps with an anchor point;
        For each possible orientation (yaw, roll, pitch) with
        $\pi/2$ increment:
            Rotate the virtual bounding box about the anchor point.
            For each resulting vertex except for the anchor point:

-continued

Test if the resulting virtual bounding box is within the free space,
                If true:
                      Obtain a legal arrangement,
                Else:
                      break.

---

The processor 210 may identify all of the legal arrangements and may sort the legal arrangements based upon a predetermined packing quality criteria. Additionally, if the z-orientation is fixed, for instance, to minimize the height of the virtual bounding boxes packed into the build envelope 600, the processor 210 may reduce the orientation (yaw, roll, pitch) space. This computation may also be parallelized on a GPU.

The predetermined packing quality criteria may rank a placement solution (a given anchor point and a given virtual bounding box orientation) based upon a number of rules. The rules may include a first rule in which the ranking is based upon the resulting free space 604 having the least complexity. The rules may also include a second rule in which there are multiple solutions that pass the first rule, the solution having the shortest edge in the resulting free space 604 that is longer than the shortest edge in any other resulting free space 604 may be ranked the highest. In one regard, the rules generally enable a less complex free space 604 to be maintained as the virtual bounding boxes 602 are packed into the build envelope 600, which may increase flexibility in the free space 604 to receive new virtual bounding boxes.

According to an example, the processor 210 may output the arrangement of the virtual bounding boxes determined at block 308 of FIG. 3. For instance, the processor 210 may output the arrangement to a 3D printer 100 such that the 3D printer 100 may print the parts identified at block 302 according to the determined arrangement of the virtual bounding boxes corresponding to the parts. In another example in which the processor 210 may control the 3D printer 100, the processor 210 may control the components of the 3D printer to print the parts identified at block 302 according to the determined arrangement of the virtual bounding boxes corresponding to the parts. In a further example, the processor 210 may output the determined arrangement to a data storage device, for instance, a removable flash memory device, to another computing apparatus, to a server over a network, etc.

With reference now to the method 400 depicted in FIG. 4, at block 402, the processor 210 may identify a plurality of objects to be printed. The processor 210 may identify the objects in any of the manners discussed above with respect to block 302 in FIG. 3. Additionally, at block 404, the processor 210 may generate a respective virtual bounding box for each object. The processor 210 may generate the virtual bounding boxes for the objects in any of the manners described above with respect to block 304 in FIG. 3.

At block 406, the processor 210 may determine an arrangement of the virtual bounding boxes inside a build volume of a 3D printer that results in a free space inside of the build volume having a least complex geometry. The processor 210 may determine the arrangement of the virtual bounding boxes in any of the manners described above with respect to FIGS. 6 to 10B. In on regard, therefore, through implementation of the method 400, the processor 210 may determine an arrangement of the virtual bounding boxes that results in the free space having a least complex geometry without also requiring that the total height of the arranged virtual bounding boxes be minimized.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 11:
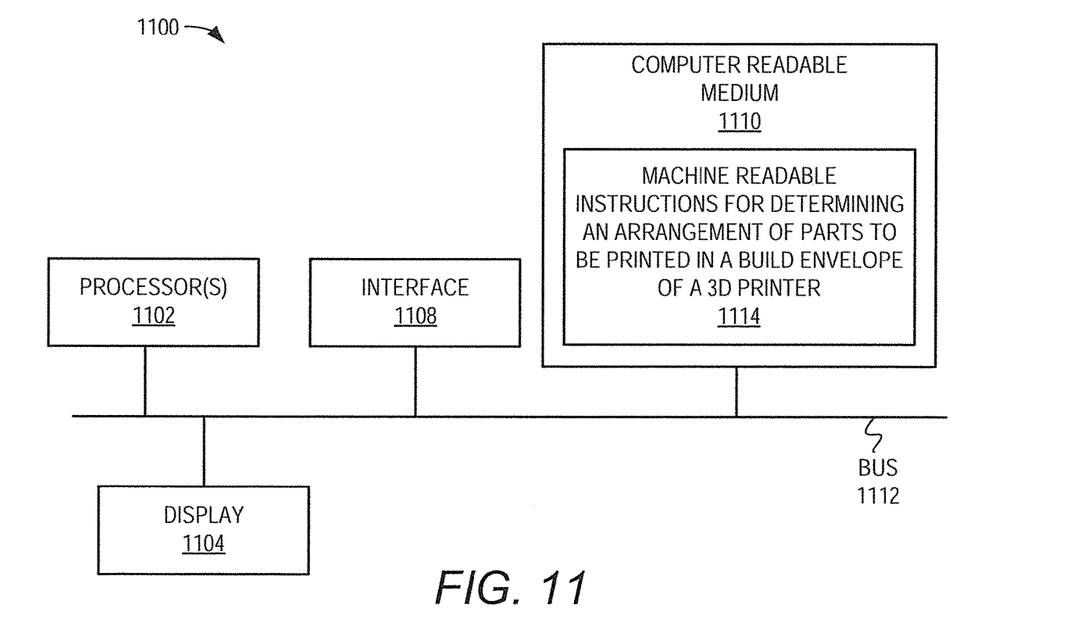
FIG. 11 shows a schematic representation of a computing apparatus, which may be equivalent to the apparatus depicted in FIG. 2, according to an example of the present disclosure.

Turning now to FIG. 11, there is shown a schematic representation of a computing apparatus 1100, which may be equivalent to the apparatus 200 depicted in FIG. 2, according to an example. The computing apparatus 1100 may include a processor 1102, a display 1104; and an interface 1108 through which the processor 1102 may communicate with a computer-readable medium 1110. Each of these components may be operatively coupled to a bus 1112. For example, the bus 1112 may be an EISA, a PCI, a USB, a FireWire, a NuBus, a PDS, or the like.

The computer readable medium 1110 may be any suitable medium that participates in providing instructions to the processor 1102 for execution. For example, the computer readable medium 1110 may be non-volatile media, such as an optical or a magnetic disk; volatile media, such as memory. The computer-readable medium 1110 may also store machine readable instructions for determining an arrangement of parts to be printed in a build envelope of a 3D printer 1114, which, when executed may cause the processor 1102 to perform either or both of the methods 300 and 400 depicted in FIGS. 3 and 4.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for determining an arrangement of parts to be printed in a build envelope of a three dimensional (3D) printer, said method comprising:
   identifying a plurality of parts to be printed;
   generating a respective virtual bounding box for each of the plurality of parts;
   determining that a total volume occupied by the generated virtual bounding boxes falls below a predetermined threshold of the build envelope; and
   determining, by a processor, an arrangement of the virtual bounding boxes inside the build envelope that results in a total height of the virtual bounding boxes being minimized and results in a shortest edge of the virtual bounding boxes forming a free space inside of the build envelope being longer than the shortest edge of the virtual bounding boxes in other candidate arrangements of the virtual bounding boxes, to enhance efficiency in printing of the plurality of parts by the 3D printer.

2. The method according to claim 1, wherein generating a respective virtual bounding box for each of the plurality of parts further comprises:
   for each part of the plurality of parts,
      rotating the part to change a volume of the virtual bounding box for the part;
      based on the rotating of the part, determining an orientation of the part that results in the virtual bounding box having a minimal volume; and
   generating the virtual bounding box having the minimal volume for the part.

3. The method according to claim 1, wherein generating a respective virtual bounding box for each of the plurality of parts further comprises:
   for each part of the plurality of parts,
      determining whether a predefined property exists for the part that causes a particular build orientation of the part to be maintained;
      in response to a determination that the predefined property exists, selecting a height orientation for the part corresponding to the particular build orientation; and
      rotating the part about an axis that is perpendicular to a height direction that results in a smallest cross-sectional area in a plane perpendicular to the height direction.

4. The method according to claim 1, wherein determining an arrangement of the virtual bounding boxes inside the build envelope further comprises:
   determining an arrangement of the virtual bounding boxes that results in the free space inside of the build envelope having a least complex geometry.

5. The method according to claim 4, wherein determining an arrangement of the virtual bounding boxes further comprises determining an arrangement of the virtual bounding boxes that results in a total number of edges of the virtual bounding boxes forming the free space being minimized.

6. The method according to claim 1, further comprising:
   sorting the virtual bounding boxes based upon a property of the respective virtual bounding boxes;
   generating a sorted parts list corresponding to the sorted virtual bounding boxes;
   wherein determining an arrangement of the virtual bounding boxes further comprises determining a placement of a first virtual bounding box of a first part at the top of the sorted parts list in the build envelope; and
   determining placement of the virtual bounding boxes of the remaining parts in the sorted parts list in the build envelope following the determined placement of the first virtual bounding box.

7. The method according to claim 6, wherein generating the sorted parts list further comprises generating the sorted parts list to sort the parts according to longest edges of the virtual bounding boxes in descending order.

8. The method according to claim 7, further comprising:
   following the determined placement of the first part, determining placement of a next part in the sorted parts list with respect to the first part to be at a location inside of the free space in the build envelope that does not overlap the first part and results in the free space having a least complex geometry.

9. The method according to claim 8, wherein each of the free space and the first part includes a plurality of edges defined by vertices serving as anchor points, and wherein determining placement of the next part further comprises:
- for each of the anchor points, determining a solid angle facing towards the free space;
- sorting the anchor points according to their respective solid angles in descending order;
- for each vertex of the virtual bounding box of the next part,
  - translating the virtual bounding box such that the vertex overlaps with the anchor point having a highest solid angle;
  - for each possible orientation movement with a predetermined increment,
    - rotate the virtual bounding box about the anchor point;
    - for each resulting vertex except for the anchor point, obtain an arrangement that results in the virtual bounding box being within the free space;
  - ranking candidate arrangements resulting from each of the possible orientation movement according to:
    - the resulting free space having the least complexity; and
    - if multiple candidate arrangements have the least complexity, selecting the candidate arrangement having the shortest edge in the resulting free space that is longer than the shortest edge in the resulting free space of the other candidate arrangements.

10. An apparatus for determining arrangements of objects to be printed in a build volume of a three dimensional (3D) printer, said apparatus comprising:
- a processor; and
- a memory on which is stored machine readable instructions that when executed cause the processor to:
  - identify a plurality of objects to be printed by the 3D printer;
  - generate a respective virtual bounding box for each of the plurality of objects; and
  - determine an arrangement of the virtual bounding boxes inside the build volume that results in a free space inside of the build volume having a least complex geometry and results in a shortest edge of the virtual bounding boxes forming the free space inside of the build volume being longer than the shortest edge of the virtual bounding boxes in other candidate arrangements of the virtual bounding boxes, to enhance efficiency in printing of the plurality of objects by the 3D printer.

11. The apparatus according to claim 10, wherein to determine the arrangement of the virtual bounding boxes, the machine readable instructions are further to cause the processor to determine an arrangement of the virtual bounding boxes that results in a total number of edges of the virtual bounding boxes forming the free space being minimized.

12. The apparatus according to claim 10, wherein to determine the arrangement of the virtual bounding boxes, the machine readable instructions are further to cause the processor to determine an arrangement of the virtual bounding boxes that results in a total height of the bounding boxes being minimized.

13. The apparatus according to claim 10, wherein the machine readable instructions are further to cause the processor to:
- sort the virtual bounding boxes based upon a property of the virtual bounding boxes; and
- generate a sorted objects list corresponding to the sorted virtual bounding boxes;
- wherein, to determine the arrangement of the virtual bounding boxes, the machine readable instructions are executable to cause the processor to:
  - determine a placement of a first virtual bounding box of a first object at the top of the sorted objects list in the build volume; and
  - following the placement of the first virtual bounding box of the first object, determine a placement of a next virtual bounding box of a next object in the sorted objects list to be at a location inside of the free space in the build volume that does not overlap the first virtual bounding box and results in the free space having a least complex geometry.

14. A non-transitory computer readable storage medium on which is stored machine readable instructions that when executed by a processor, cause the processor to:
- identify a plurality of objects to be printed by a three dimensional (3D) printer;
- generate a respective virtual bounding box for each of the plurality of objects; and
- determine an arrangement of the virtual bounding boxes inside the build volume that results in a free space inside of the build volume having a least complex geometry and results in a shortest edge of the virtual bounding boxes forming the free space inside of the build volume being longer than the shortest edge of the virtual bounding boxes in other candidate arrangements of the virtual bounding boxes, to enhance efficiency in printing of the plurality of objects by the 3D printer.

15. The non-transitory computer readable storage medium according to claim 14, wherein the machine readable instructions are further to cause the processor to determine an arrangement of the bounding boxes that results in a total height of the virtual bounding boxes being minimized.

16. The non-transitory computer readable storage medium according to claim 14, wherein, to determine an arrangement of the virtual bounding boxes inside the build volume, the machine readable instructions are further to cause the processor to:
- determine an arrangement of the virtual bounding boxes that results in a total number of edges of the virtual bounding boxes forming the free space being minimized.

17. The non-transitory computer readable storage medium according to claim 14, wherein the machine readable instructions are further to cause the processor to:
- sort the virtual bounding boxes based upon a property of the virtual bounding boxes; and
- generate a sorted objects list corresponding to the sorted virtual bounding boxes;
- wherein, to determine the arrangement of the virtual bounding boxes, the machine readable instructions are executable to cause the processor to:
  - determine a placement of a first virtual bounding box of a first object at the top of the sorted objects list in the build volume; and
  - following the placement of the first virtual bounding box of the first object, determine a placement of a next virtual bounding box of a next object in the sorted objects list to be at a location inside of the free space in the build volume that does not overlap the first virtual bounding box and results in the free space having a least complex geometry.

* * * * *